United States Patent [19]
Li

[11] Patent Number: 5,702,215
[45] Date of Patent: Dec. 30, 1997

[54] RETRACTABLE FIXATION DEVICE

[75] Inventor: Lehmann K. Li, Milford, Conn.

[73] Assignee: Li Medical Technologies, Inc., Shelton, Conn.

[21] Appl. No.: 461,713

[22] Filed: Jun. 5, 1995

[51] Int. Cl.$^6$ .................................................. F16B 13/04
[52] U.S. Cl. ........................... 411/21; 411/24; 411/29; 411/26; 411/32
[58] Field of Search .................... 411/24, 26, 27, 411/28, 29, 38, 34, 37, 32, 33, 21

[56] References Cited

U.S. PATENT DOCUMENTS

| | | |
|---|---|---|
| Re. 34,293 | 6/1993 | Goble et al. . |
| Re. 34,762 | 10/1994 | Goble et al. . |
| 1,247,621 | 11/1917 | Bennett . |
| 2,100,570 | 11/1937 | Saleh . |
| 2,143,086 | 1/1939 | Pleister . |
| 2,213,715 | 9/1940 | Monahan . |
| 2,453,056 | 11/1948 | Zack . |
| 2,562,419 | 7/1951 | Ferris . |
| 3,048,177 | 8/1962 | Takaro . |
| 3,143,915 | 8/1964 | Tendler ............................ 411/29 |
| 3,155,095 | 11/1964 | Brown . |
| 3,227,031 | 1/1966 | Williams ........................... 411/26 |
| 3,254,650 | 6/1966 | Collito . |
| 3,316,796 | 5/1967 | Young ............................. 411/29 |
| 4,011,602 | 3/1977 | Rybicki et al. . |
| 4,233,981 | 11/1980 | Schomacher . |
| 4,293,259 | 10/1981 | Liebig . |
| 4,379,451 | 4/1983 | Getscher . |
| 4,447,915 | 5/1984 | Weber . |
| 4,454,612 | 6/1984 | McDaniel et al. . |
| 4,501,266 | 2/1985 | McDaniel . |
| 4,525,114 | 6/1985 | Hirst ............................. 411/395 |
| 4,636,121 | 1/1987 | Miller ............................ 411/21 |
| 4,708,132 | 11/1987 | Silvestrini . |
| 4,738,255 | 4/1988 | Goble et al. . |
| 4,741,330 | 5/1988 | Hayhurst . |
| 4,744,793 | 5/1988 | Parr et al. . |
| 4,747,407 | 5/1988 | Liu et al. . |
| 4,759,765 | 7/1988 | Van Kampen . |
| 4,772,286 | 9/1988 | Goble et al. . |
| 4,776,330 | 10/1988 | Chapman et al. . |
| 4,870,957 | 10/1989 | Goble et al. . |
| 4,875,474 | 10/1989 | Border . |
| 4,892,547 | 1/1990 | Brown . |
| 4,898,156 | 2/1990 | Gatturna . |
| 4,899,743 | 2/1990 | Nicholson et al. . |
| 4,901,711 | 2/1990 | Goble et al. . |
| 4,911,153 | 3/1990 | Border . |

(List continued on next page.)

FOREIGN PATENT DOCUMENTS

| | | |
|---|---|---|
| 0270704 | 6/1988 | European Pat. Off. . |
| 1368021 | 6/1964 | France . |
| 2622430 | 5/1989 | France . |
| 343992 | 3/1931 | United Kingdom . |
| 9204874 | 4/1992 | WIPO . |

*Primary Examiner*—Steven N. Meyers
*Assistant Examiner*—Fredrick Conley
*Attorney, Agent, or Firm*—Ostrolenk, Faber, Gerb & Soffen, LLP

[57] ABSTRACT

A fastener for securing two members together through an aligned bore in the two members, the fastener comprising a longitudinally extending body having at least one opening adjacent each of respective ends thereof, the body having a central bore hole, a threaded shaft concentrically disposed in the central bore hole and having opposite threads at each end, with a rotation applying member at an accessible end, a nut provided on each of the opposite threads in threaded engagement with the respective thread, at least one longitudinally extending engaging finger attached to each of the nuts and disposed adjacent a respective one of the openings, the fingers being adapted to extend through the respective opening when the shaft is turned in a first direction to cause the nuts to move toward each other, thereby causing the fingers to engage, when the openings at each end are disposed in the aligned bore adjacent different ones of said two members to be secured together, with respective ones of said two members, thereby securing the two members together.

21 Claims, 6 Drawing Sheets

U.S. PATENT DOCUMENTS

| | | |
|---|---|---|
| 4,927,421 | 5/1990 | Goble et al. . |
| 4,946,468 | 8/1990 | Li . |
| 4,959,071 | 9/1990 | Brown et al. . |
| 4,960,420 | 10/1990 | Goble et al. . |
| 4,968,315 | 11/1990 | Gatturna . |
| 4,985,032 | 1/1991 | Goble . |
| 4,986,263 | 1/1991 | Dickerson et al. . |
| 4,997,433 | 3/1991 | Goble et al. . |
| 5,002,550 | 3/1991 | Li . |
| 5,002,574 | 3/1991 | May et al. . |
| 5,011,473 | 4/1991 | Gatturna . |
| 5,013,316 | 5/1991 | Goble et al. . |
| 5,019,105 | 5/1991 | Wiley . |
| 5,037,422 | 8/1991 | Hayhurst et al. . |
| 5,037,426 | 8/1991 | Goble et al. . |
| 5,046,513 | 9/1991 | Gatturna . |
| 5,078,730 | 1/1992 | Li . |
| 5,084,058 | 1/1992 | Li . |
| 5,087,263 | 2/1992 | Li . |
| 5,092,891 | 3/1992 | Kummer et al. . |
| 5,094,563 | 3/1992 | Carletti . |
| 5,129,902 | 7/1992 | Goble et al. . |
| 5,133,723 | 7/1992 | Li et al. . |
| 5,141,520 | 8/1992 | Goble et al. . |
| 5,147,166 | 9/1992 | Harker ............................................ 411/29 |
| 5,147,362 | 9/1992 | Goble . |
| 5,152,764 | 10/1992 | Goble . |
| 5,161,916 | 11/1992 | White et al. ............................... 411/24 |
| 5,163,946 | 11/1992 | Li . |
| 5,174,087 | 12/1992 | Bruno . |
| 5,176,682 | 1/1993 | Chow . |
| 5,192,303 | 3/1993 | Gatturna et al. . |
| 5,203,787 | 4/1993 | Noblitt et al. . |
| 5,207,679 | 5/1993 | Li . |
| 5,217,486 | 6/1993 | Rice et al. . |
| 5,250,058 | 10/1993 | Miller et al. . |
| 5,263,802 | 11/1993 | Fichot et al. ............................... 411/26 |
| 5,263,991 | 11/1993 | Wiley et al. . |
| 5,266,075 | 11/1993 | Clark et al. . |
| 5,268,001 | 12/1993 | Nicholson et al. . |
| 5,300,077 | 4/1994 | Howell . |
| 5,306,290 | 4/1994 | Martins et al. . |
| 5,312,416 | 5/1994 | Spaeth et al. . |
| 5,312,422 | 5/1994 | Trott . |
| 5,312,438 | 5/1994 | Johnson . |
| 5,313,962 | 5/1994 | Obenchain . |
| 5,314,427 | 5/1994 | Goble et al. . |
| 5,314,429 | 5/1994 | Goble . |
| 5,314,433 | 5/1994 | Li . |
| 5,318,577 | 6/1994 | Li . |
| 5,324,308 | 6/1994 | Pierce . |
| 5,330,534 | 7/1994 | Herrington et al. . |
| 5,342,366 | 8/1994 | Whiteside et al. . |
| 5,350,380 | 9/1994 | Goble et al. . |
| 5,354,298 | 10/1994 | Lee et al. . |
| 5,354,300 | 10/1994 | Goble et al. . |
| 5,356,413 | 10/1994 | Martins et al. . |
| 5,358,511 | 10/1994 | Gatturna et al. . |
| 5,372,599 | 12/1994 | Martins . |
| 5,372,604 | 12/1994 | Trott . |
| 5,376,120 | 12/1994 | Sarver et al. . |
| 5,393,302 | 2/1995 | Clark et al. . |
| 5,443,482 | 8/1995 | Stone et al. . |
| 5,464,425 | 11/1995 | Skiba . |
| 5,464,427 | 11/1995 | Curtis et al. . |
| 5,486,197 | 1/1996 | Le et al. . |
| 5,500,001 | 3/1996 | Trott . |
| 5,531,792 | 7/1996 | Huene . |
| 5,534,004 | 7/1996 | Santangelo . |
| 5,545,180 | 8/1996 | Le et al. . |

RETRACTABLE FIXATION DEVICE

BACKGROUND OF THE INVENTION

The present invention relates to a fixation or anchoring device, and in particular, to a fixation device for securing two members together. In particular, the present invention relates to a retractable fixation device which can be inserted and removed from an aligned aperture bored through two members to be connected by the fixation device. Even more particularly, the present invention relates to such a fixation device which can be used in medical applications, for example, in securing broken or fractured bones together. Although the invention has particular application to the medical field, it can also be used in other industries, for example, the construction industry or wherever it is desired to couple two or more parts together.

SUMMARY OF THE INVENTION

Accordingly, it is an object of the invention to provide a fixation device for securing two members together.

It is yet still a further object of the present invention to provide a retractable fixation device which can be removed as easily as it can be inserted into an aligned opening in two members to be secured together.

It is yet still a further object of the present invention to provide such a fixation device which can be inserted into a blind hole, i.e., a hole which does not go all the way through at least one of the members to be secured together.

It is yet still a further object of the present invention to provide a fixation device which has particular application to the medical field, i.e., for securing broken or fractured bones together.

It is yet still a further object of the present invention to provide a fixation device or anchor which can be implanted into one member to provide an attachment point for other devices, for example, sutures, prosthetic devices or an interconnecting member for connecting the member to another member.

It is yet still a further object of the present invention to provide a fixation device for use in the construction industry or in the manufacture or assembly of products for fixing two members together.

The above and other objects of the present invention are achieved by a fastener for securing two members together through an aligned bore in the two members, the fastener comprising a longitudinally extending body having at least one opening adjacent each of respective ends thereof, the body having a central bore hole, a threaded shaft concentrically disposed in said central bore hole and having opposite threads at each end, with a rotation applying member at an accessible end, a nut provided on each of said opposite threads in threaded engagement with the respective thread, at least one longitudinally extending engaging finger attached to each of said nuts and disposed adjacent a respective one of said openings, the fingers being adapted to extend through the respective opening when said shaft is turned in a first direction to cause the nuts to move toward each other, thereby causing the fingers to engage, when the openings at each end are disposed in the aligned bore adjacent different ones of said two members to be secured together, with respective ones of said two members, thereby securing the two members together.

The objects of the present invention are also achieved by an anchor for securement into a bore in a member comprising, a first body having at least one opening therein, the body being adapted to be inserted into the bore in the member, the body have a central bore therein, and a second body disposed concentrically in the central bore, the second body being longitudinally movable in said central bore, the second body having at least one finger extending longitudinally away from the second body, the finger being disposed adjacent the opening in the first body, whereby when said first body is moved longitudinally in said second body in a first direction, the finger extends through the opening to engage the bore in the member preventing removal of said first and second bodies.

The objects of the present invention are also achieved by an anchor for securement into a bore in a member comprising a first cylindrical body having first and second collar portions and intermediate the collar portions, a plurality of longitudinally extending segments connected each at opposite ends to the respective collar portions, a second body concentric with the first body and disposed in a central bore of the first body, the first body being movable longitudinally with respect to the second body and the longitudinally extending segments being adapted to flex outwardly to engage a bore in the member into which the anchor is inserted when said first body is moved relative to said second body in a first longitudinally extending direction.

The objects of the invention are also achieved by a fastener for securing two members together through an aligned bore in the two members, the fastener comprising a first cylindrical body having first and second collar portions and intermediate the collar portions, a plurality of longitudinally extending segments connected each at opposite ends to the respective collar portions, a second cylindrical body having first and second collar portions and intermediate the collar portions, a plurality of longitudinally extending segments connected each at opposite ends to the respective collar portions, a third body comprising a threaded shaft concentric with the first body and the second body and disposed through a central bore in each of the first and second bodies, the threaded shaft being threaded at each end with opposite threads, the first and second bodies being disposed on respective ones of said threads, one of said first and second collar portions of each of said first and second bodies comprising a threaded nut engaging a respective one of said threads and the longitudinally extending segments of each of said first and second bodies being adapted to flex outwardly to engage a wall of the aligned bore of respective ones of said two members when the threaded shaft is turned in a first direction to cause the nuts to move toward each other, thereby causing the segments to engage with the wall of the bore of the respective ones of said two members, thereby securing the two members together.

BRIEF DESCRIPTION OF THE DRAWINGS

The invention will now be described in greater detail in the following detailed description with reference to the drawings, in which.

DETAILED DESCRIPTION OF THE INVENTION

Figure 1:
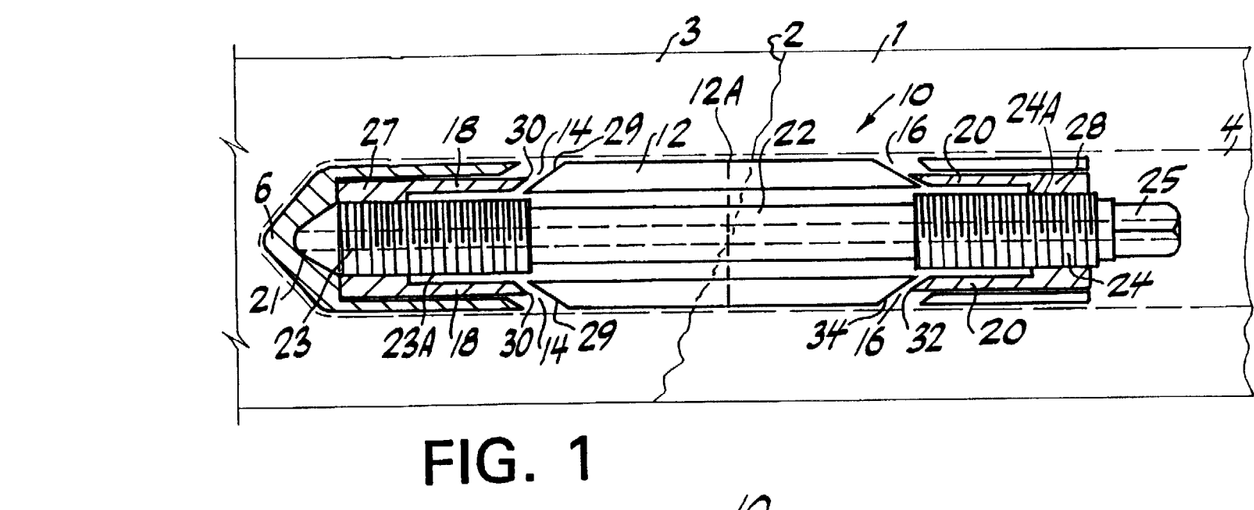
FIG. 1 shows one embodiment of a retractable fixation device for securing two members together after it has been inserted in an aligned bore in the two members but prior to fixation in the bore.
Figure 2:
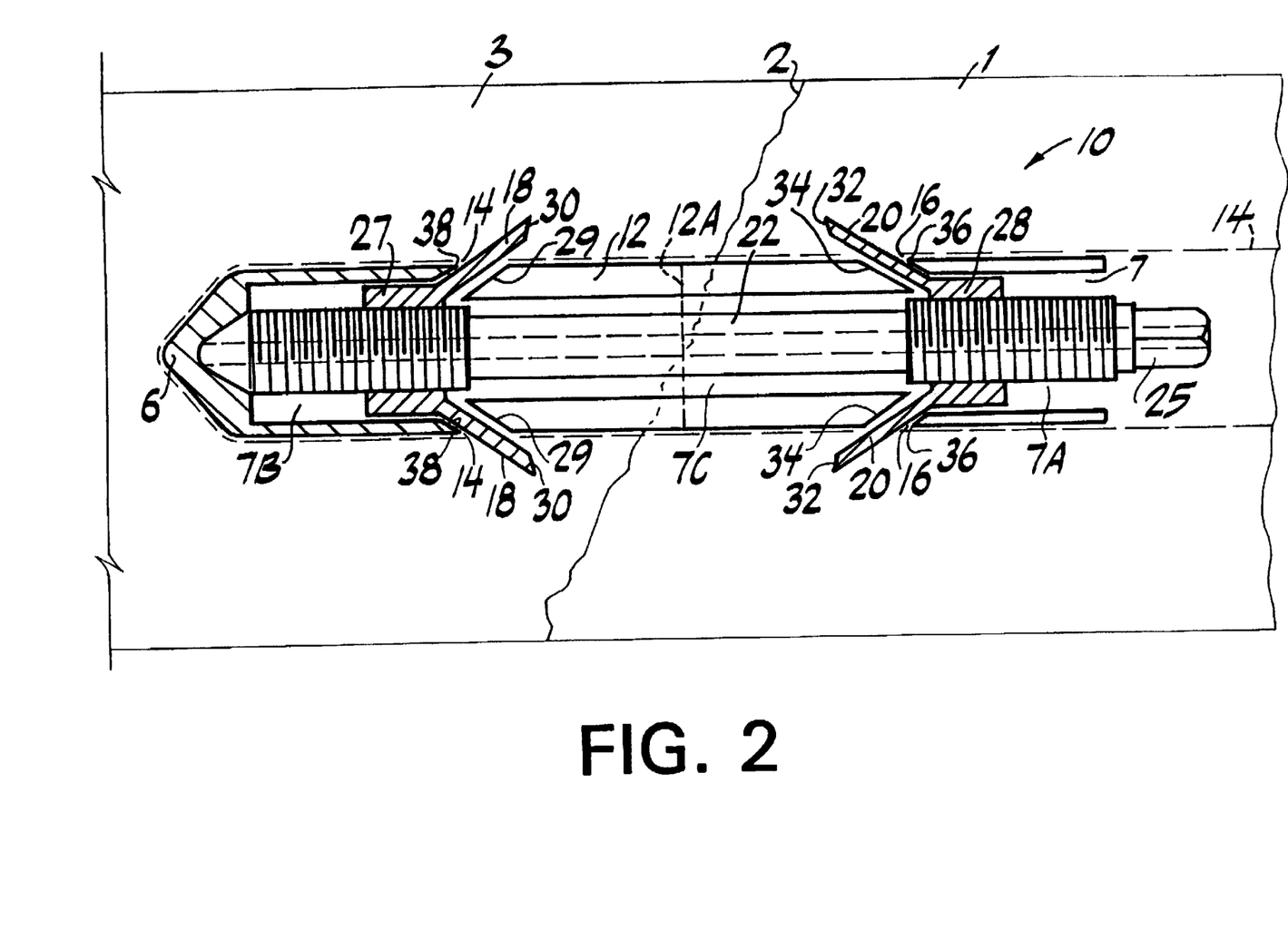
FIG. 2 shows the fixation device of FIG. 1 in its position securing the two members together.
Figure 3:
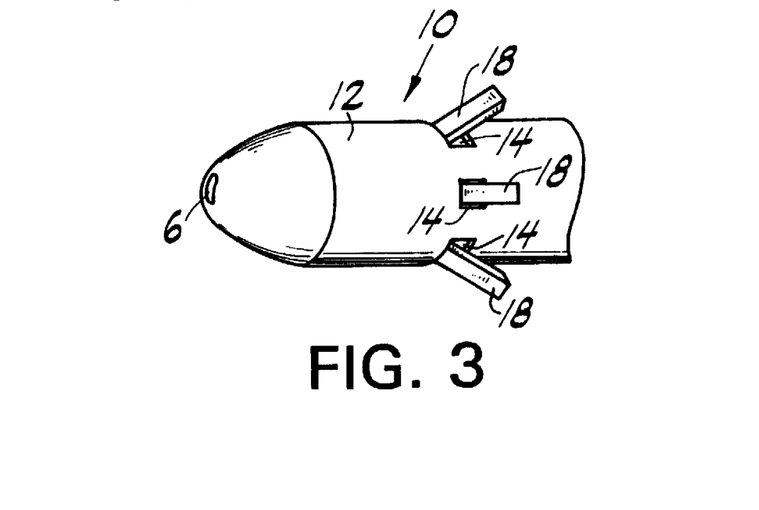
FIG. 3 shows one portion of the fixation device of FIGS. 1 and 2, wherein the securing elements are shown in their extended position and the portion of the fixation device is shown in perspective view.

With reference now to the drawings, FIGS. 1, 2 and 3 show a first embodiment of a fixation device according to the invention. The fixation device shown in FIGS. 1, 2 and 3 can have application in many areas, for example, in the medical field as well as in the construction industry and in the manufacture of a variety of goods where components would be secured together, particularly if the connection must be hidden from view. In FIGS. 1 and 2, the device is shown in a medical application for securing two fractured bones to mend a calcaneus fracture. The two bone parts are indicated by 1 and 3 and the calcaneus fracture is shown schematically by the reference numeral 2.

The fixation device is inserted into, for example, an aligned blind hole drilled into the two pieces 1 and 3. The fixation device, generally indicated at 10, may be inserted into the blind bore 4 after the drilling step, or alternatively, the fixation device 10 itself can be attached to a suitable drill and have a tip 6 which itself is a drill bit. In the latter circumstance, the drilling step also comprises the insertion step and after insertion, the drill is removed from the fixation device, leaving it in the bore 4.

The fixation device 10 comprises a generally cylindrical body 12. The cylindrical body 12, may, as discussed, have a drill bit 6 provided at its insertion end. The cylindrical body 12 has a plurality of openings or windows 14 at one end and 16 at another end, through which individual ones of respective flexible engaging elements 18 and 20 protrude upon activation, as discussed below. FIG. 1 shows the engaging elements 18 and 20 prior to activation. FIG. 2 shows the device 10 with engaging elements 18 in their extended position through the openings 14 and engaging elements 20 in then extended position through openings 11. FIG. 3 shows the innermost end portion with the engaging elements 18 in the extended position.

The device 10 further includes a threaded shaft 22, the threaded shaft being threaded at each end 23 and 24 thereof such that the threads 23A and 24A are opposite, i.e., one of the threads 23A, 24A is a left-hand thread and the other of the threads 23A, 24A is a right-hand thread. For example, thread 23A may be a left-hand thread and thread 24A may be a right-hand thread. At the end opposite the insertion end, the threaded shaft 22 is provided with a tightening nut 25 or screw head which allows the shaft 22 to be rotated. Threadedly engaged with each end 23, 24 is a respective nut 27, 28. The nut 27 has the engaging elements 18 attached or secured thereto. Preferably, the engaging elements 18 are made integral with the nut 27.

Similarly, nut 28 also has its engaging members 20 secured or attached thereto or made integral therewith.

In order to secure the two members 1 and 3 together, once the device 10 is inserted into the opening 4, the nut 25 is rotated. The rotation of the shaft 22 causes the two nuts 27 and 28 to begin moving toward each other as shown in FIG. 2. The openings 14 provided for each of the engaging elements 18 are provided with inclined surfaces 29 so that as the engaging elements move toward the fracture zone 2, the correspondingly slanted surfaces 30 on each of the engaging elements 18 will abut and engage with the slanted surfaces 29 on the body 12. This will cause the engaging elements 18 to flex and move outwardly along the surfaces 29 as the nuts 27 and 28 move toward each other. The engaging elements 18 will eventually extend out of the openings 14 as the nut 25 is turned in a tightening direction until the elements 18 extend outside the body 12, thereby engaging with the wall of the bore 4 in the member 1 to be secured to the member 2. This will cause a frictional or piercing engagement of the elements 18 with the member 1.

Similarly, at the other end, as the nut 25 is turned, the engaging elements 20 having slanted surfaces 32 will engage with surfaces 34 of the openings 16, thereby causing the elements 20 to flex and extend through the openings 16 to bite into or frictionally engage with the member 3 to be secured to the member 1.

Accordingly, upon tightening the nut 25, a secure attachment of the member 1 to the member 3 is accomplished as the threaded nuts 27 and 28 move toward each other, causing the elements 18 and 20 to move outwardly and engage with the members 1 and 3.

When the device 10 is used for medical applications, it is preferably made of a suitable biocompatible metal or other material, for example, plastic.

The engaging elements 18 and 20 are made of a suitable flexible or bendable material. Suitable materials include bendable metals and plastics. If the device is used in the medical field, these materials preferably are biocompatible or bioabsorbable, as is the entire device.

The present invention also allows ease of retraction from the opening 4, for example, once the fracture zone 2 has healed. When the nut 25 is turned in the direction opposite to a tightening direction thereby to cause the nuts 27 and 28 to move away from each other, this operation causes the engaging elements 18 and 20 also to move away from each other and follow the respective openings 14 and 16 back into the central opening 7 in the interior of the body 12. When the nut 25 is turned the appropriate number of times, the engaging elements 18 and 20 will substantially assume the position shown in FIG. 1, completely retracted back into the body of the device 10. As shown, the body 12 has slanted faces 36 and 38 at the respective openings 14 and 16 to ease the retraction of the engaging elements 18 and 20 back into the central opening 7 in the body.

As shown in FIGS. 1 and 2, the body 12 is formed such that the central opening 7 has generally wider areas 7A and 7B and a generally narrower area 7C. This keeps the device together as a unit in the assembled condition because the engaging elements 18 prevent the pulling out of the shaft 22 because they will abut and engage against the faces 29 if a pulling action is provided to the nut 25. Furthermore, as shown in FIGS. 1 and 2, the body 12 may be made in two pieces as shown by the dotted line 12A. It will not fall apart because the shaft 22 and engaging elements 18 and 20 will keep the device together as a single unit.

The fixation device may also be provided with a central passageway or lumen 21 which can receive a guide pin. See FIG. 1. The guide pin is installed by first drilling with the guide pin, which has a drill bit at one end, through the members 1 and 3, inserting a cannulated drill over the guide and using the cannulated drill enlarge the bore hole 4 to the required diameter. The cannulated drill is then removed, and the fixation device is then passed over the guide pin using the central lumen 21 to maintain alignment.

Figure 4:
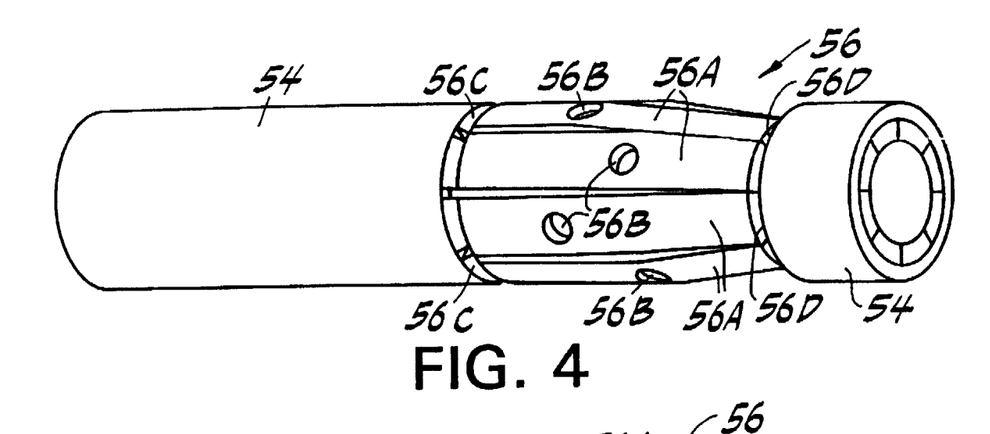
FIG. 4 shows another embodiment of a retractable fixation device in an inactivated position and which is used as an anchoring device.
Figure 5:
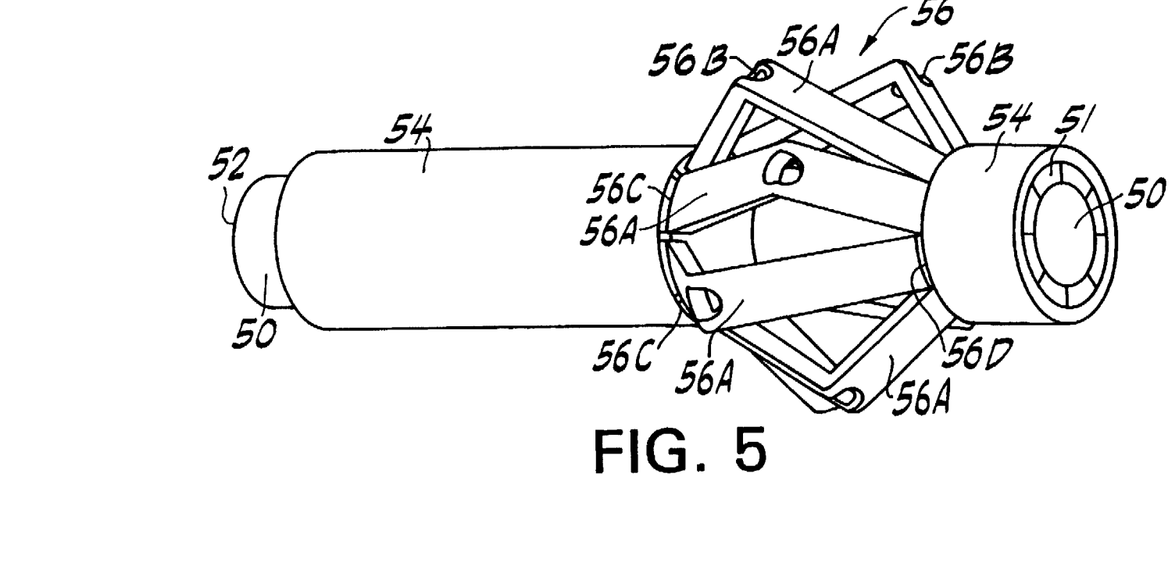
FIG. 5 shows the device of FIG. 4 in its activated position.

FIGS. 4 and 5 show another embodiment of the invention. The embodiment of the invention shown in FIGS. 4 and 5 comprises an insertable anchoring device which can be inserted into an opening, for example, a blind opening similar to opening 4 in member 3 shown in FIGS. 1 and 2. The device of FIGS. 4 and 5 may be inserted into an opening to secure another member to the member in which the device is inserted. For example, the device shown in FIGS. 4 and 5 may serve as an anchor for sutures, prosthetic devices or other connecting members for connecting one member to another member.

The device shown in FIGS. 4 and 5 comprises a first inner shaft 50 which may have a threaded hole or other suitable attaching point at the end 52. Surrounding the shaft 50 is a cylinder 54 which is slidable on or with respect to the shaft 50. The cylinder 54 has a region 56 in which it is divided into a plurality of longitudinally extending segments 56A. Each of the longitudinally extending elements 56A are separated along their lengths from others of the longitudinally extending segments and may be formed by suitable means, for example, by cutting, slicing, etc. in the cylindrical member 54. According to the invention, means are provided on each of the segments 56A at specific points for causing the segments to flex at the specific points. In the embodiment shown in FIGS. 4 and 5, the specific points at which the segments bend is determined by the weakening of each segment as shown by the bore holes 56B formed in the segments and slits 56C and 56D, which form hinge lines where the segments connect with the cylinder 54.

The holes 56B in the embodiments shown are also preferably provided so that they are not in the same line with adjacent ones of the segments. The bores 56B alternate so that the segments 56A bend at alternate locations. The reason for preferably forming the bending points 56B in the segments 56A at alternate locations is so that when the device is inserted into a member, the longitudinally extending segments 56A, by suitable activation, will spread outwardly, bending at the alternate points 56B and also at hinge points 56C and 56D. In order to spread the load caused by the engaging elements 56A in the member to which it is attached, the bending points 56B are provided in the described alternate locations. This minimizes the stress to the member in which the device is inserted, preventing stress from being applied along a single plane and causing any stress to be distributed along two planes. This reduces the chance that the member in which the fastener is inserted will rupture along a plane defined by the points 56B. As can readily be ascertained from FIGS. 4 and 5, the bending points 56B may be provided at a plurality of locations greater than two (defining more than two planes) such that the stress provided by the engaging elements 56A is distributed over a wide portion of the bore in which the device is inserted.

To activate the device, suitable means are employed to slide the cylindrical member 54 with respect to the shaft 52. For example, a pushing force can be applied to the cylindrical member 54 to cause the elements 56A to flex and extend outwardly, thereby engaging the bore into which the device is inserted. Alternatively, shaft 50 can have a pulling or tensile force applied thereto while member 54 is held fixed. In such case, shaft 50 must be fixedly coupled to cylinder 54 at end 51.

Any suitable element can then be attached to the exposed end 52, for example, sutures, prosthetic devices, screws and other connecting members, etc.

Although the device shown in FIGS. 4 and 5 may be employed in the medical field, it can also be employed in the construction and other industries, for example, in the manufacture of products. When used in the medical field, the fastener is suitably biocompatible.

Although holes 56B are shown in FIGS. 4 and 5 in order to provide the weakened bending points in the longitudinal extending engaging elements 56A, other suitable provisions can be made for causing bending to take place at the appropriate points. For example, score lines or notches running across the width of the elements 56A can be provided at suitable points to cause bending along those points. Additionally, the sharp edges surrounding the holes 56B (or score lines) provide suitable gripping surfaces for securing the fastener in the bore in the members in which the fastener is inserted.

Furthermore, a plurality of bending points can be provided on individual ones of the elements 56A. In this case, the stress can be even further distributed to the member in which the device is secured.

Figure 6:
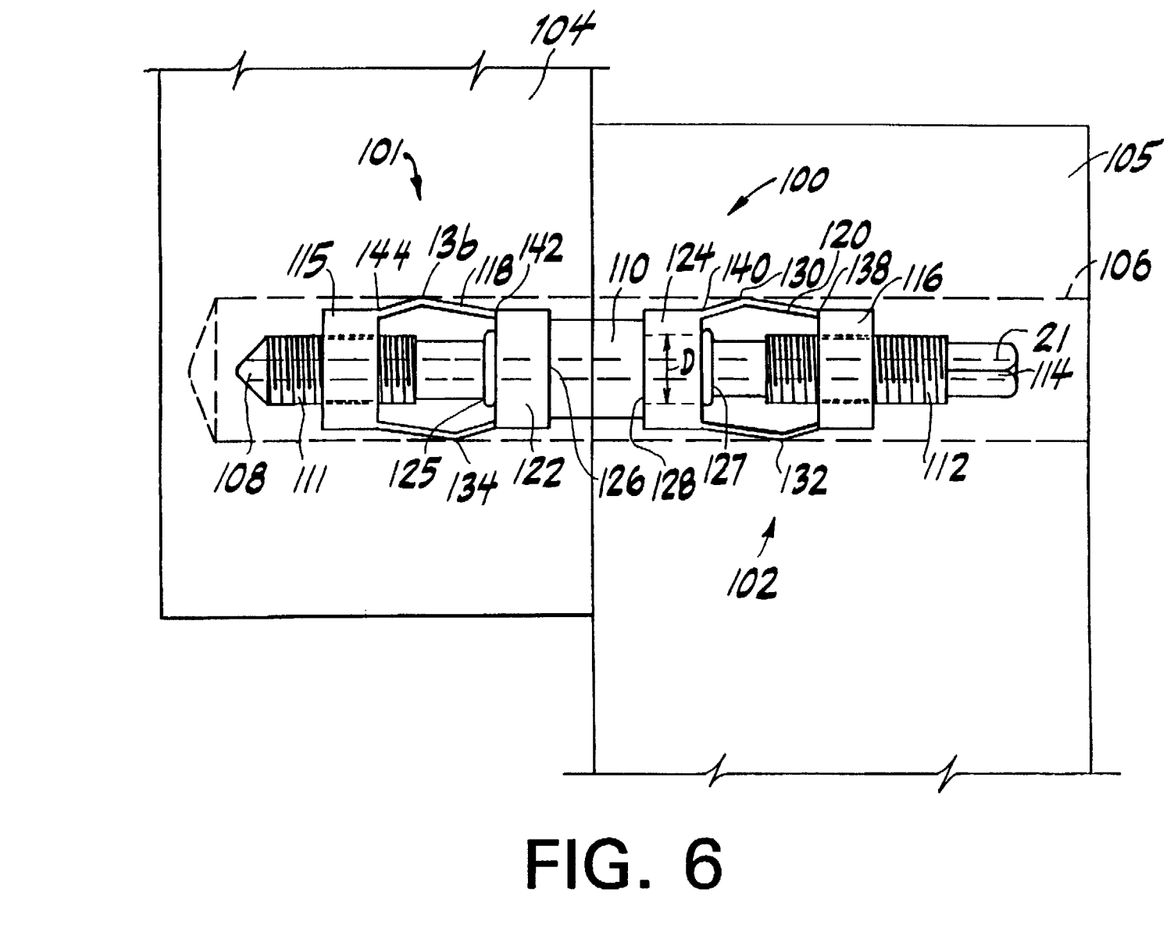
FIG. 6 shows another embodiment of the invention showing a fixation device for securing two members together utilizing the engaging elements of the device shown in FIGS. 4 and 5.

FIG. 6 shows a retractable fixation device generally designated 100 using two elements 101 and 102 each utilizing the principles of the device shown in FIGS. 4 and 5. As in the device shown in FIGS. 1 to 3, this device is suitable for joining two members together, for example, members 104 and 105 shown in FIG. 6. The device 100 is inserted into an aligned bore 106 or may itself have a drill tip 108 provided at its insertion end in which case the act of drilling is also the act of insertion. Once inserted into the opening 106, the threaded shaft 110, having opposite threads 111 and 112, is turned via the nut 114. As in the embodiment of FIGS. 1 to 3, threads 111 and 112 are opposite threads so that one is a left-hand thread and the other one is a right-hand thread. Nuts 115 and 116 are provided in threaded engagement with respective threads 111 and 112 of shaft 110. Engaging members 118 and 120 like the engaging members 56A of FIGS. 4 and 5 are provided such that they are attached to the respective nuts 115 and 116 and preferably are made integral with nuts 115 and 116.

The engaging members 118 are also secured to a collar 122 and engaging members 120 are secured to a collar 124. Collars 122 and 124 abut against shoulders 126 and 128 of shaft 110. Shaft 110 is formed at this point such that its diameter is larger than the diameter D of the threaded portion of the shaft, thereby securing the collars 122 and 124 from moving toward each other. It may also be necessary to provide suitable abutting means 125 and 127, such as snap-rings, to prevent movement of collars 122 and 124 away from each other during retraction of the device.

In use, as the nut 114 is turned to tighten and secure the two members 104 and 105 together, the opposite threads 111 and 112 cause the nuts 115 and 116 to move toward other. The collars 122 and 124 stay in longitudinal position by virtue of their abutting against the shoulders 126 and 128. This will cause the engaging elements 118 and 120 to move radially outwardly, causing them to bend at their bending points 130, 132, 134 and 136 as well as 138, 140, 142 and 144. As shown, the bending points 130 and 132 and 134 and 136 in the embodiment shown in FIG. 6 are provided along two planes for each element 101 and 102 to distribute the stress to the members 104 and 105.

FIG. 6 also shows the optional provision of a central passageway or lumen 21 for receiving a guide pin; as described previously.

Figure 7:
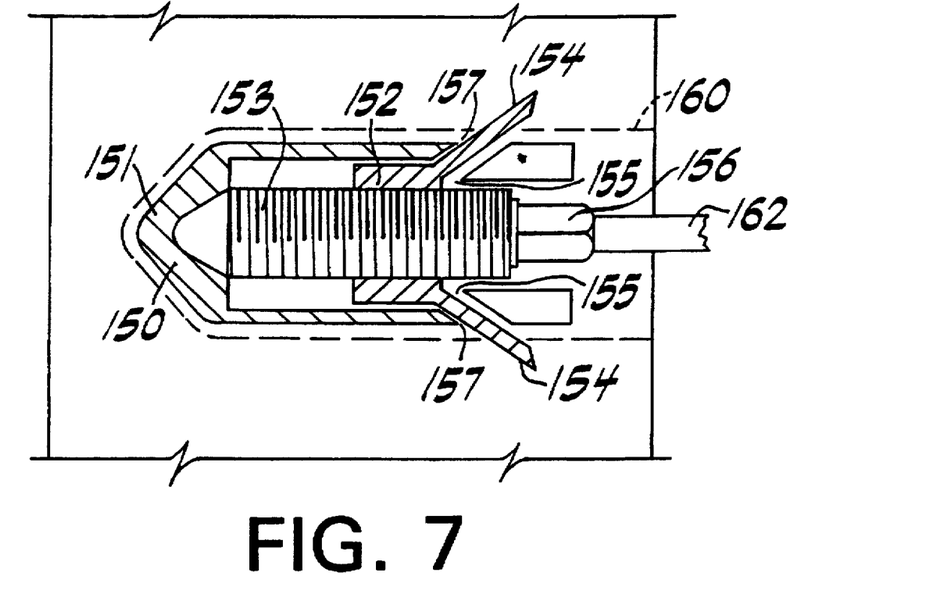
FIGS. 7, 8 and 9 show alternative anchoring devices.
Figure 8:
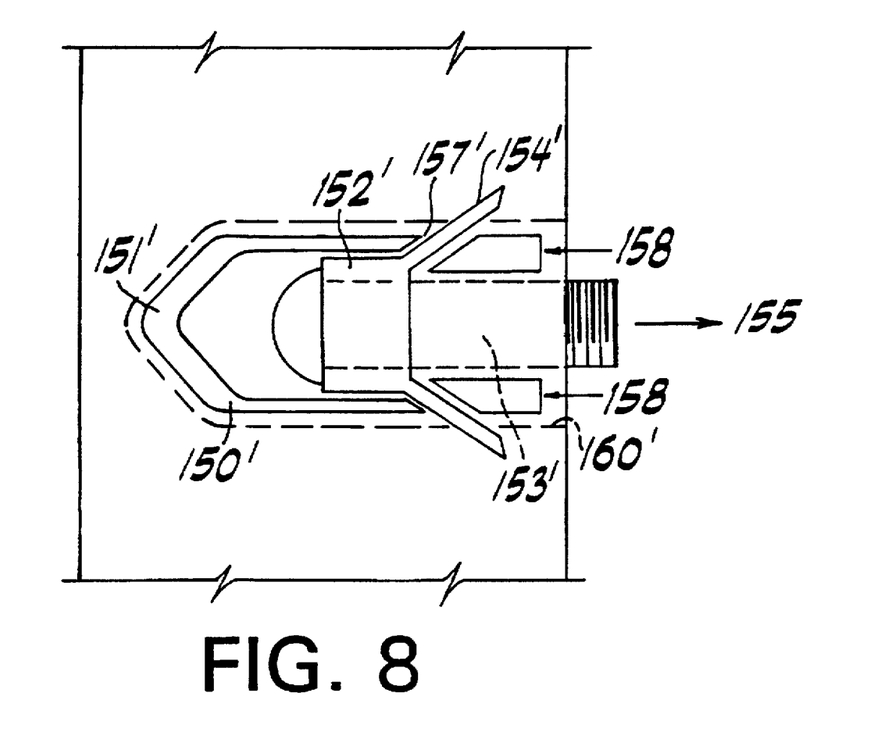
Figure 9:
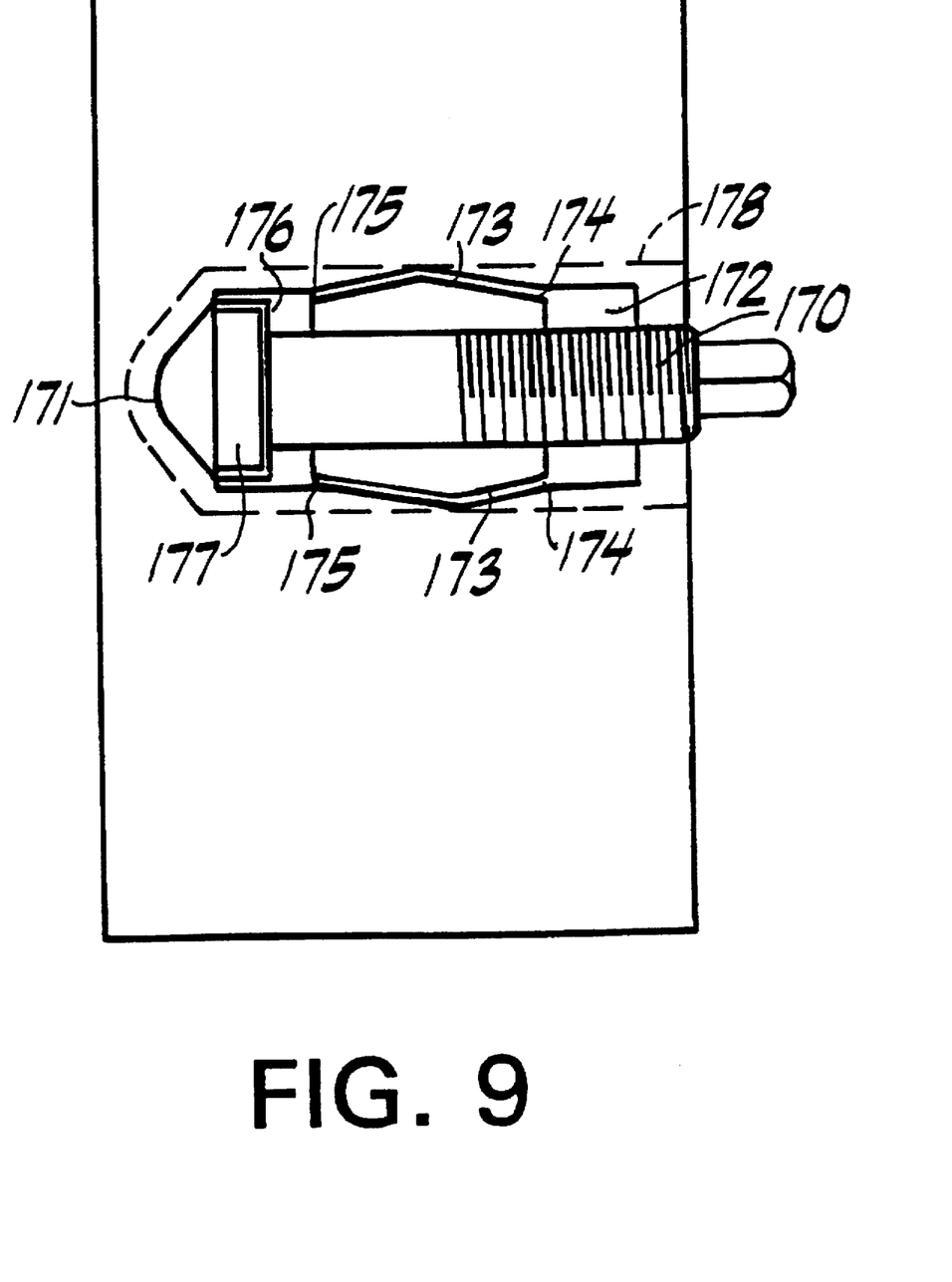

FIGS. 7, 8 and 9 show other embodiments of fastening devices in accordance with the present invention. In the embodiments of FIGS. 7 and 8, finger-like engaging elements are provided as in the embodiment of FIGS. 1 to 3. In both there figures, the moving element is shown boldly in the activated position and in phantom in the disengaged position.

In the embodiment of FIG. 7, the fastener includes an enclosure 150 (which may be formed as a drill bit 151). Inside the enclosure 150 is provided a nut 152 in threaded engagement with a threaded shaft 153. The nut 152 has a plurality of engaging fingers 154. When the shaft 153 is turned to activate the fastener, the fingers 154 abut against surfaces 155, causing thee fingers, upon further turning of nut 156 to flex and move upwardly through openings 157 into engagement with the wall of the bore 160.

The fastener of FIG. 7 is also retractable. By reversing rotation of shaft 153, the fingers 154 can be retracted from engagement with the wall of the bore 160.

Also shown in FIG. 7 is a connecting member 162 which may be a shaft threaded into shaft 153 for the connection of other devices or elements to the fastener of FIG. 7. Alternatively, if the fastener is a medical fastener, sutures may be secured to the fastener of FIG. 7.

FIG. 8 shows another embodiment in which the fastener includes an enclosure 150', threaded shaft 153' and collar 152' having fingers 154'. A pulling force (arrow 155) is provided on shaft 153' while a retaining force (arrows 158) is applied to enclosure 150' to cause the fingers 154' to flex and extend through openings 157' into engagement with the wall of bore 160'. A reverse force, e.g., a striking blow, may later be used in order to retract the fastener from engagement.

FIG. 9 shows yet another embodiment wherein the engaging members of FIGS. 4, 5 and 6 are used. The fastener has a threaded shaft 170 and may have a drill bit end 171. A first nut 172 is threadedly engaged with shaft 170. The engaging members 173 are attached to nut 172 at an end 174 and attached at another end 175 to a collar 176, which is slidably received around head 177 of shaft 170.

In use, shaft 170 is turned in a tightening direction and the members 173 move radially outwardly, as shown, to engage the wall of bore 178. As in the embodiments of FIGS. 7 and 8, the fastener of FIG. 9 is retractable by reversing rotation of shaft 170.

In all embodiments shown, wherein a threaded shaft is used, the nuts may be suitably held to prevent rotation with the shaft to ensure radial movement of the respective engaging elements.

Furthermore, in all embodiment described, including those of FIGS. 7, 8 and 9, a central lumen can be provided through the center shafts for receiving a guide pin, as shown in the embodiments of FIGS. 1 and 6, with reference to central lumen 21.

As discussed, the devices of the present invention have applications in the medical field and in other fields as well, including the construction industry and other industries in which parts must be held together, particularly where conventional threaded fasteners or other fasteners such as rivets cannot be employed.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A fastener for securing two members together through an aligned bore in the two members, the fastener comprising:
   a longitudinally extending body having at least one opening adjacent each of respective ends thereof, the body having a central bore hole, a threaded shaft concentrically disposed in said central bore hole and having opposite threads at each end, with a rotation applying member at an accessible end;
   a nut provided on each of said opposite threads in threaded engagement with the respective thread, at least one longitudinally extending deformable engaging finger coupled to each of said nuts and disposed adjacent a respective one of said openings; and
   the at least one finger being adapted to extend through the respective opening when said shaft is turned in a first direction to cause the nuts to move toward each other, thereby causing the fingers to engage, when the openings at each end are disposed in the aligned bore adjacent different ones of said two members to be secured together, with respective ones of said two members, thereby securing the two members together, said fingers each being deformable when extending radially through a respective one of the openings and adapted to penetrate into a respective one of said two members, each opening having a cam surface for engagement by the respective engaging fingers, the engaging fingers being directed along the cam surface at an angle away from the longitudinally extending body through the opening as the nuts move toward each other.

2. The fastener of claim 1, wherein the body has a plurality of openings at each end and an engaging finger adjacent each opening for extension through the respective opening.

3. The fastener of claim 2, wherein the openings have slanted surfaces to facilitate the extension of said fingers through the openings.

4. The fastener of claim 3, wherein the engaging fingers have tips engagable with the slanted openings which cause the fingers to move outwardly when said shaft is turned in the first direction.

5. The fastener of claim 4 wherein the tips have slanted surfaces to facilitate extension of the fingers through the openings.

6. The fastener of claim 1, wherein when said shaft is turned in a second direction opposite the first direction, said fingers retract through the respective openings back into the central bore hole.

7. The fastener of claim 2, wherein when said shaft is turned in a second direction opposite the first direction, said fingers retract through the respective openings back into the central bore hole.

8. The fastener of claim 7, wherein the openings have slanted surfaces to facilitate retraction of said fingers.

9. The fastener of claim 1, further comprising a drill bit at an insertion end of said body, thereby allowing the fastener to be inserted during a step of drilling the aligned bore in the two members to be secured together.

10. The fastener of claim 1, further comprising a center lumen through the threaded shaft for receiving a guide pin.

11. The fastener of claim 1, wherein the opposite threads comprise a left-hand thread end a right-hand thread.

12. The fastener of claim 1, wherein said body is split into two pieces.

13. The fastener of claim 1, wherein the central bore hole has first wider sections for receiving respective ones of said nuts and a narrower section intermediate said wider sections, the openings defining transitions between said wider and narrower sections, said engaging fingers abutting surfaces of said openings thereby maintaining said shaft in said central bore hole and said fastener together as a unit.

14. An anchor for securement into a bore in a member comprising:

a first body having at least one opening therein, the body being adapted to be inserted into the bore in the member, the body have a central bore therein; and a second body disposed concentrically in the central bore, the second body being longitudinally movable in said central bore, the second body having at least one deformable finger extending longitudinally away from the second body, the finger being disposed adjacent the opening in the first body, whereby when said second body is moved longitudinally in said first body in a first direction, the finger deforms and extends through the opening to penetrate into a sidewall of the bore in the member preventing removal of said first and second bodies, the opening having a cam surface for engagement by the finger, the finger being directed along the cam surface at an angle away from the first body through the opening as the finger moves through the opening.

15. The anchor of claim 14, wherein the first body has a plurality of openings and said second body has a plurality of fingers aligned with respective ones of said openings for extension through said openings.

16. The anchor of claim 15, wherein said second body further comprises a member for moving said second body in said first direction.

17. The anchor of claim 16, wherein the member for moving comprises a threaded shaft.

18. The anchor of claim 16, wherein the member for moving comprises a shaft for exerting a pulling force on said second body.

19. The anchor of claim 14, further comprising an attachment point on said second body for securing a connecting member to said second body.

20. The anchor of claim 16, wherein said member for moving is adapted to be moved in a second direction opposite the first direction thereby to retract the fingers from engagement with said bore.

21. The anchor of claim 15, wherein the first body comprises a drill bit at an insertion end.

* * * * *